United States Patent [19]

Buringrud et al.

[11] Patent Number: 5,511,530
[45] Date of Patent: Apr. 30, 1996

[54] MODULAR FUEL LINE HEATER

[75] Inventors: Elmore S. Buringrud, Monroe; Jan B. Stephens, Vashon, both of Wash.

[73] Assignee: Paccar Inc., Bellevue, Wash.

[21] Appl. No.: 328,350

[22] Filed: Oct. 24, 1994

[51] Int. Cl.⁶ .................................................. F02M 31/00
[52] U.S. Cl. ........................................................ 123/549
[58] Field of Search ................................... 123/549, 557, 123/546, 547, 552; 219/205, 202

[56] References Cited

U.S. PATENT DOCUMENTS

| | | | |
|---|---|---|---|
| 4,345,141 | 8/1982 | Little | 123/549 |
| 4,372,279 | 2/1983 | Parks | 123/557 |
| 4,398,084 | 8/1983 | Walty | 219/528 |
| 4,483,304 | 11/1984 | Yokoi et al. | 123/549 |
| 4,600,825 | 7/1986 | Blazejovsky | 123/549 |
| 4,684,786 | 8/1987 | Mann et al. | 123/549 |
| 4,748,960 | 6/1988 | Wolf | 123/549 |
| 4,790,285 | 12/1988 | Wolf | 123/549 |
| 4,892,996 | 1/1990 | Mertes | 123/549 |
| 5,038,725 | 8/1991 | Okazaki et al. | 123/549 |
| 5,054,459 | 10/1991 | Reimer et al. | 123/549 |

*Primary Examiner*—Margerite Macy
*Attorney, Agent, or Firm*—Seed and Berry

[57] ABSTRACT

A modular fuel line heating apparatus is shown and described. In a preferred embodiment, a length of heat tape is coupled to a feed-through device, the feed-through device being adapted to detachably attach to various fittings, depending upon the desired location of the heat tape. The heat tape may be placed in a fuel draw tube, or in a hose of the fuel line, or in both, depending on the desired configuration and severity of operating conditions. A temperature sensor is provided in the fuel line to sense a temperature of the fuel as it flows through the fuel line, the temperature sensor activating the heat tape when the temperature of the fuel drops below a minimum desired temperature, and deactivating the heat tape when a maximum desired fuel temperature is exceeded.

12 Claims, 9 Drawing Sheets

MODULAR FUEL LINE HEATER

TECHNICAL FIELD

This invention relates to heating devices for fuel lines, and more particularly, to a modular fuel line heating apparatus that may be positioned in various segments of a fuel line.

BACKGROUND OF THE INVENTION

When operating a diesel engine in cold weather, for example on a heavy duty truck, a commonly encountered problem is the congealing of fuel due to the crystallization of wax contained in the diesel. The crystallized wax particles can plug fuel filters, and cause uneven firing, loss of power, excessive vibration, stalling and eventual engine shutdown. If the temperature is low enough, diesel fuel can congeal in the fuel line sufficiently to prevent an engine from starting.

One method for relieving this problem is to provide heat tape within a fuel line, as described in U.S. Pat. No. 4,372,279, assigned to Paccar Inc, the assignee of the present application. This design is not completely satisfactory, however, given that some congealing may still occur upstream of the heat tape. Also, in some situations, the temperature of the fuel being sent to the engine may exceed the specifications of engine manufacturers.

A need therefore exists for an improved system for heating fuel lines.

SUMMARY OF THE INVENTION

It is therefore an object of this invention to provide an improved system for heating a fuel line.

It is another object of this invention to provide a modular fuel line heating assembly that may be easily positioned in different segments of a fuel line.

It is another object of this invention to provide a fuel line heating assembly that will monitor the temperature of fuel going to the engine.

These and other objects of the invention, as will be apparent herein, are accomplished by providing a modular, fuel line heating assembly. In a preferred embodiment, a length of heat tape is coupled to a feed-through device, the feed-through device being adapted to detachably attach to a fitting that in turn is coupled to a segment of a fuel line. For example, in a preferred embodiment, the feed-through device is provided with a threaded member that may be screwed into a "T" shaped fitting, the tee fitting being coupled to a fuel draw tube and fuel line, or fuel line and fuel filter, depending on the configuration of the fitting. In this manner, a feed-through device and coupled heat tape may be positioned in different segments of a fuel line, for example in a fuel draw tube, in a fuel line between the draw tube or tank and filter, or both.

The heat tape is provided with two conductive wires encased within a conductive material that in turn is sealed within a plastic material. In a preferred embodiment, the conductive wires of the heat tape are coupled to a terminal provided at an end of the feed-through device. Different lengths of wire, as may be required, may therefore be coupled between the terminal and a power supply and ground.

A temperature sensor is coupled to the fuel line to monitor the temperature of fuel as it flows through the fuel line, such that if the temperature of the fuel drops below a minimum temperature, the sensor activates the power supply which in turn activates the heat tape, thereby melting congealed fuel and allowing the fuel to flow freely. If the temperature of the fuel approaches a desired maximum, for example as specified by an engine manufacturer, the temperature sensor deactivates the heat tape, thereby preventing the further heating of the fuel. The potential for fuel overheating has increased in recent years due to the fact that engine manufacturers cycle fuel to the injectors via internal passages in the cylinder head, some of the fuel being heated and returned to the fuel tank, given that the injectors do not consume all of the fuel available to them. An undesirable increase in temperature can cause power loss and shorten the life of electrical components, among other problems. The use, therefore, of a heat sensor to monitor the temperature of the fuel and activate or deactivate the heating element as appropriate, provides a significant advantage as compared to prior art systems.

DETAILED DESCRIPTION OF THE INVENTION

Figure 1:
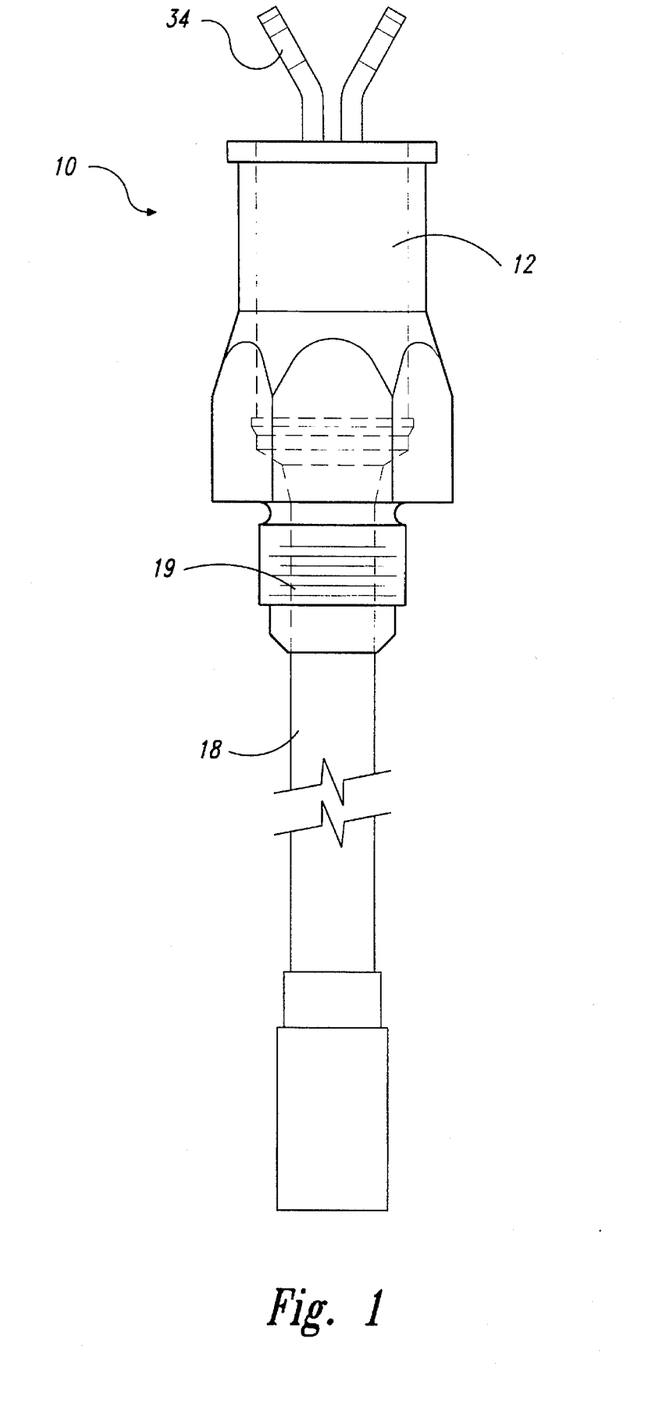
FIG. 1 is a from elevational view of a fuel line heating assembly provided in accordance with the present invention.

FIG. 1 illustrates a fuel line heating apparatus 10 provided in accordance with a preferred embodiment of the present invention. A length of heat tape 18 is coupled to a feed-through device 12. Although a variety of heat tapes may be used, in a preferred embodiment, heat tape offered by Raychem Corporation under Part No. TLT-012-DNU for 12-volt, or TLT-024-DSU for 24 volt is used. As will be understood by one of ordinary skill in the art, the heat tape is provided with two conductive wires that are spaced apart and encased within an irradiated self-limiting conductive core material, the electrical resistance of which decreases at lower temperatures and increases at higher temperatures. The core material is coated and sealed with a plastic material.

Figure 2:
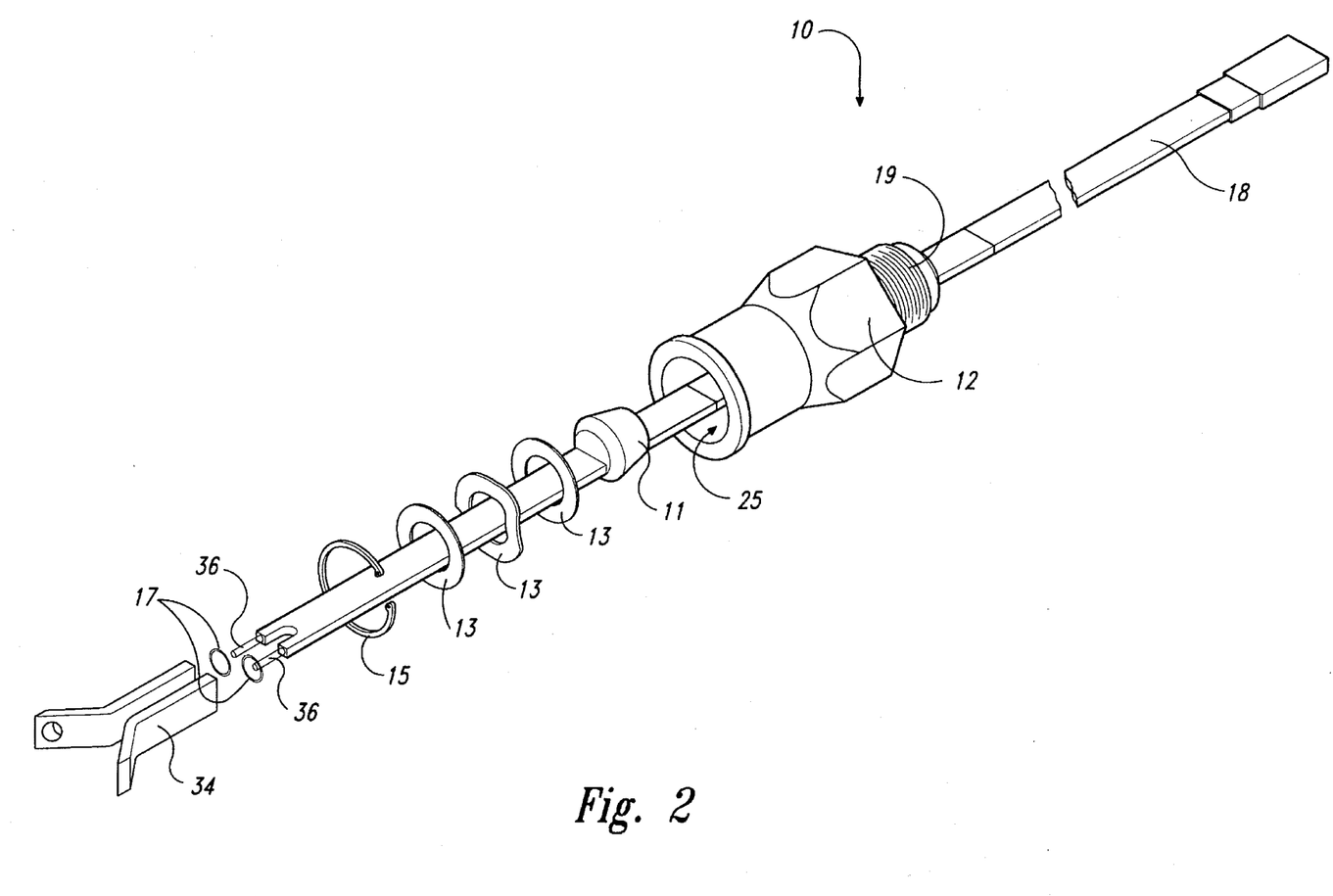
FIG. 2 is an exploded, front isometric view of the fuel line heating assembly of FIG. 1.
Figure 8:
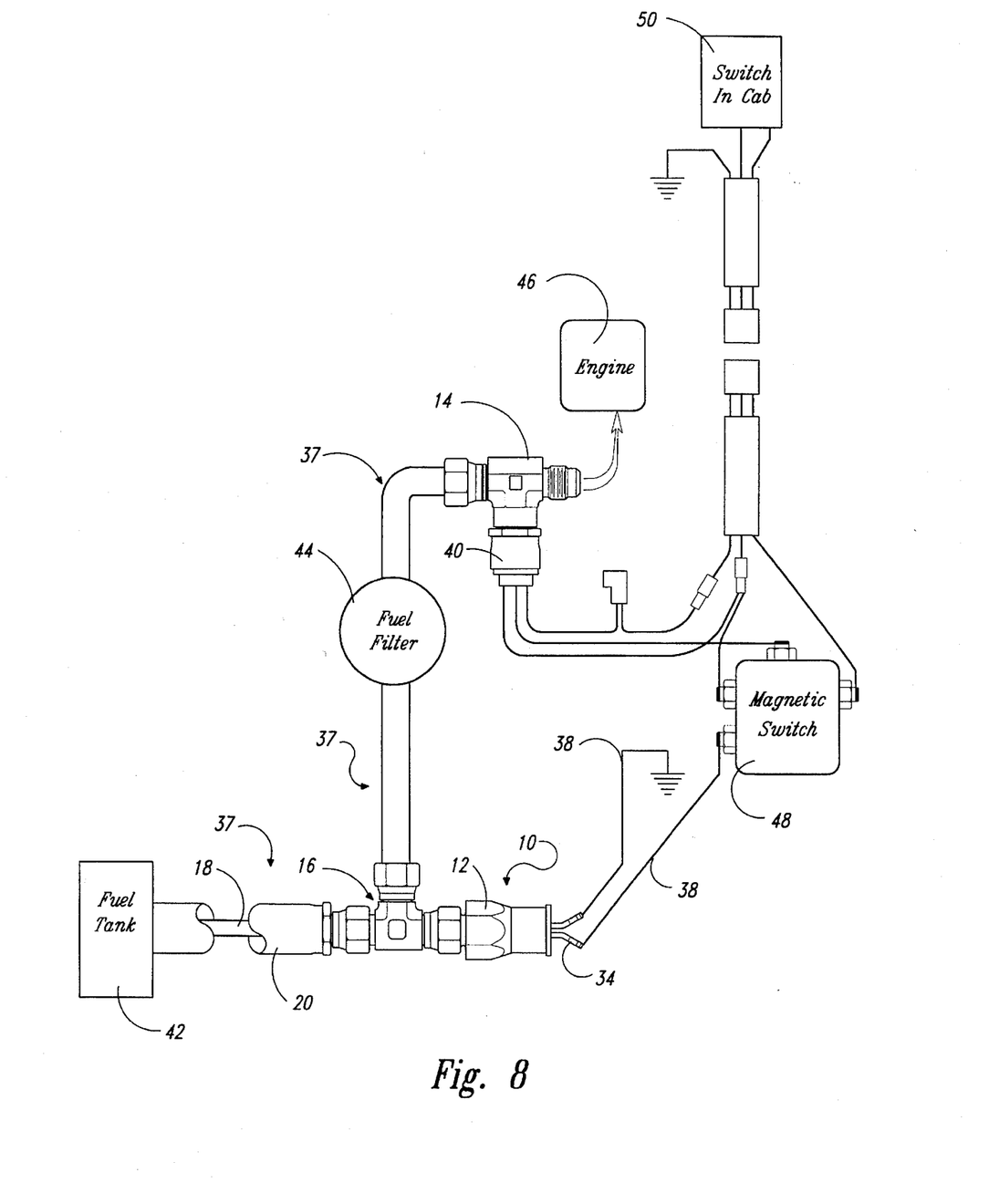
FIG. 8 is a schematic illustration of the assembly of FIG. 6 in the context of a fuel system.

As best seen in FIG. 2, heat tape 18 is sealed within feed-through device 12 via grommet 11, three washers 13 and a snap ring 15. Each of the conductive wires 36 passes through an o-ring 17, and are coupled to terminal 34. A quantity of liquid epoxy is poured into cavity 25 of feed-through device 12, thereby setting the heat tape and terminal in place. In this manner, lengths of wire 36 as necessary may then be coupled between terminal 34 and power supply 48 and ground, as illustrated in FIG. 8 and discussed in greater detail below.

Figure 3:
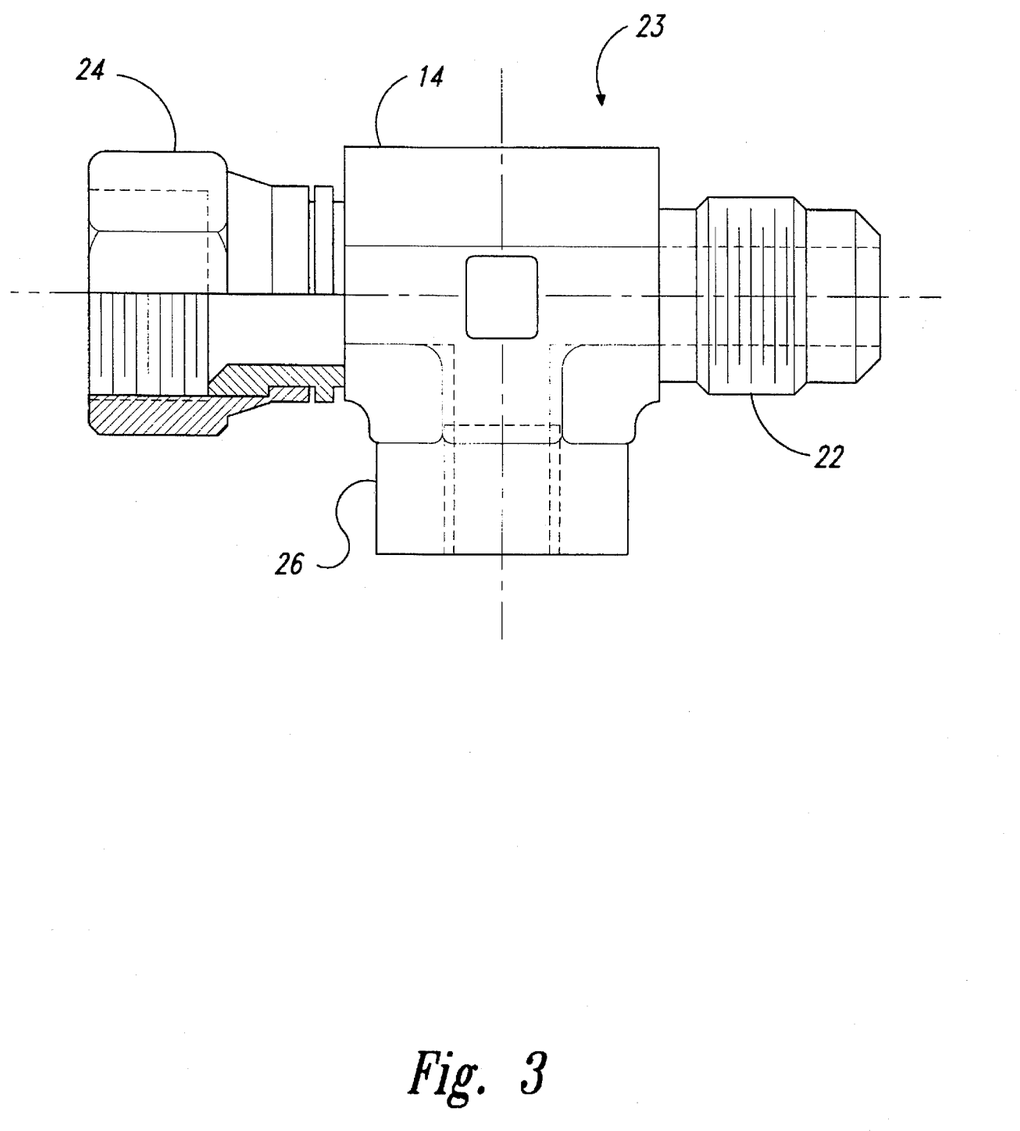
FIG. 3 is a top plan, partial cross-sectional cut-away view of a fitting provided in accordance with a preferred embodiment of the present invention.
Figure 4:
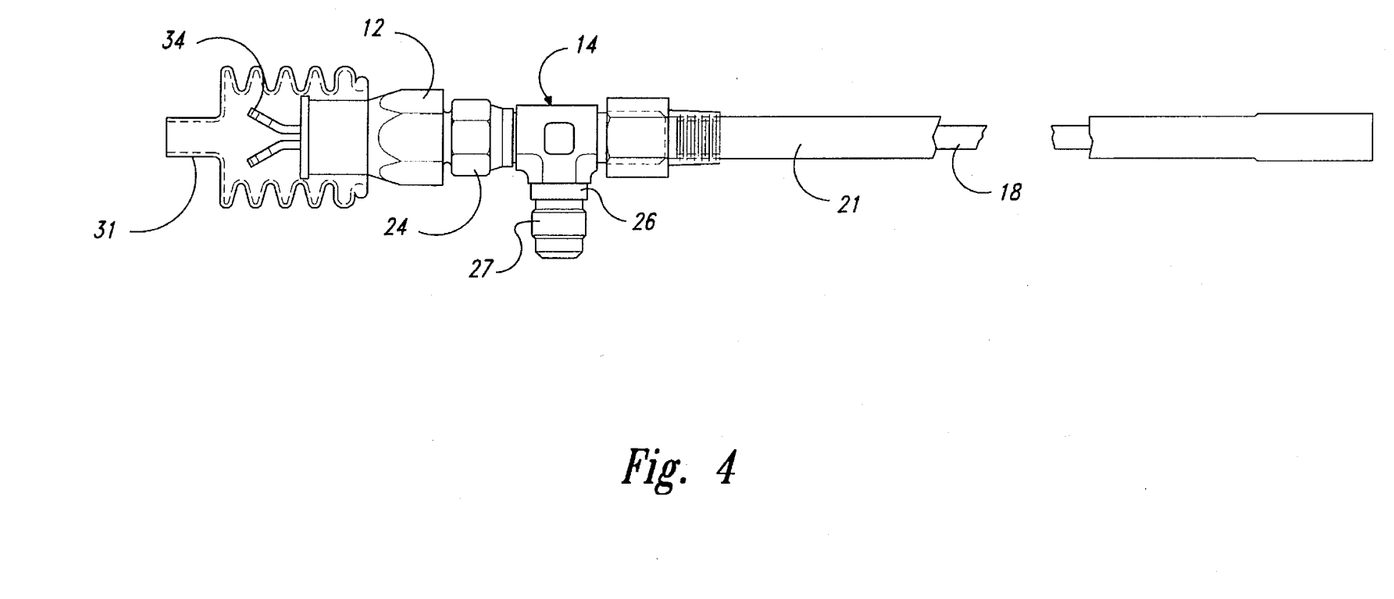
FIG. 4 is a top plan view of the fuel line heating assembly of FIG. 1 and the fitting of FIG. 3 coupled to each other and to a fuel draw tube.

As further illustrated in FIGS. 1 and 2, feed-through device 12 is adapted to detachably attach to a fitting 23. Although this may be accomplished in a variety of ways, in a preferred embodiment, feed-through device 12 is provided with a threaded member 19. Threaded member 19 may therefore be screwed into different tee fittings 23, depending upon the desired positioning of heat tape 18. For example, as illustrated in FIG. 3, a hollow "T" shaped fitting 14 is provided, tee fitting 14 having first, second, and third arms, 22, 24, and 26, respectively. As illustrated in FIG. 4, feed-through device 12 may be screwed into the second arm 24 of fitting 14, the first arm 22 of fitting 14 being coupled to fuel draw tube 21, such that heat tape 18 is positioned within draw tube 21. The third arm 26 of fitting 14 is threaded to receive adapter 27 which in turn is adapted to couple to a hose of the fuel line. If the feed through device 12 is removed for some reason, arm 24 may be capped with a plug (not shown). Tee fitting 14 is also used to couple a temperature limit switch or sensor 40 to the fuel line, as illustrated in FIG. 8 and discussed in greater detail below, sensor 40 being screwed into the third arm 26 of fitting 14.

Figure 5:
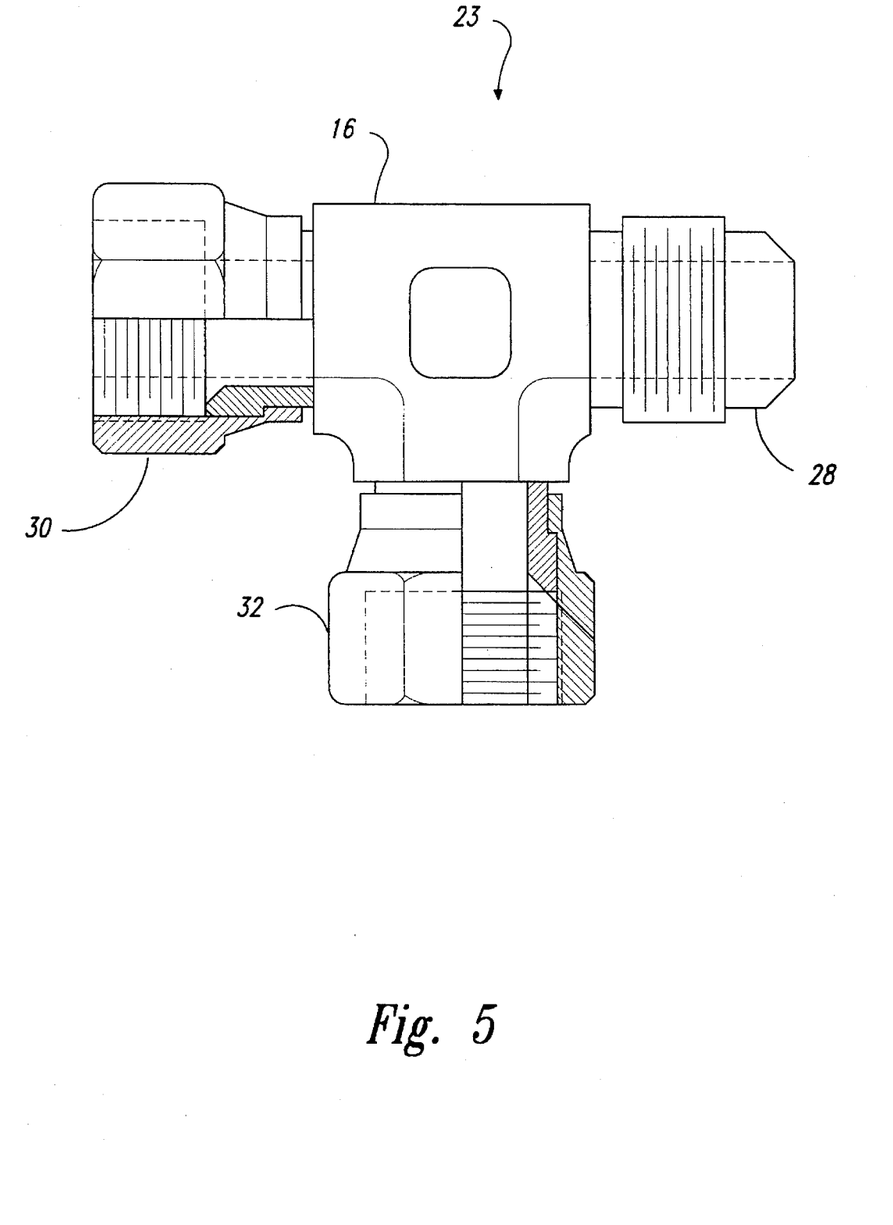
FIG. 5 is a top plan, partial cross-sectional cut-away view of an alternative fitting provided in accordance with a preferred embodiment of the present invention.
Figure 6:
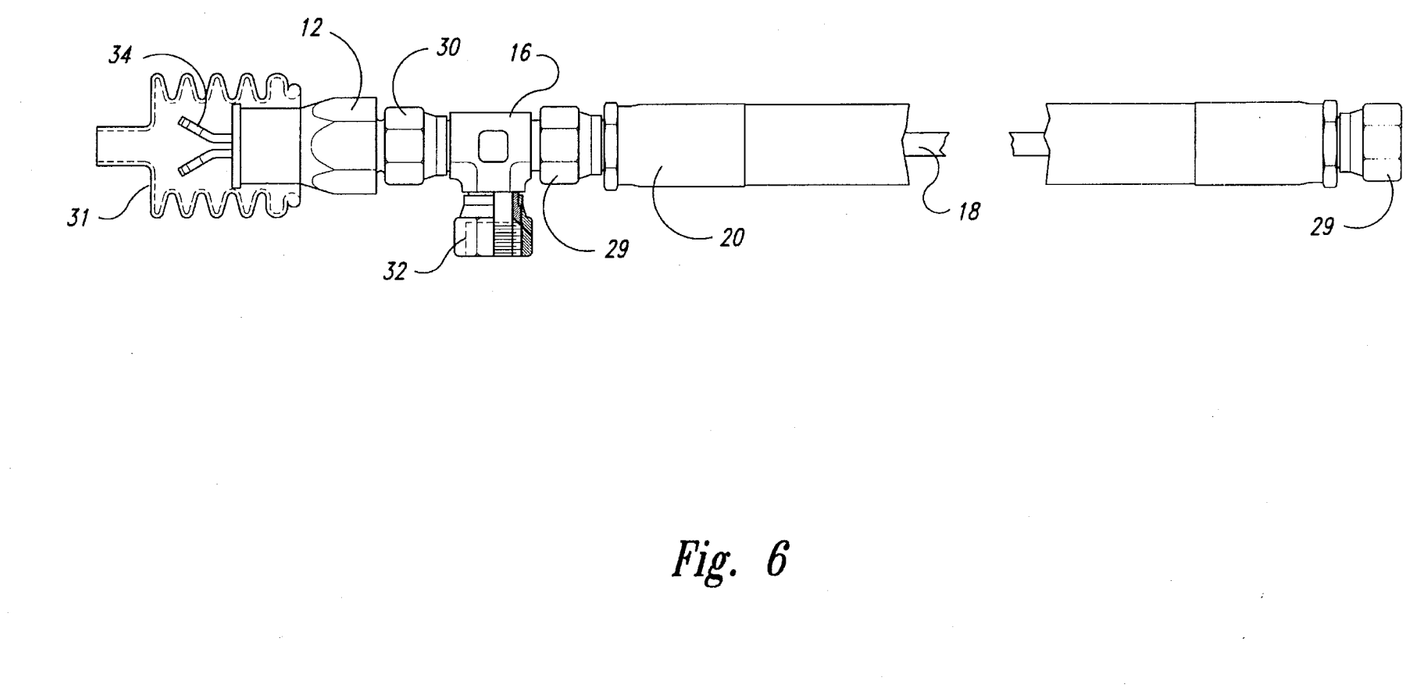
FIG. 6 is a top plan view of the fuel line heating assembly of FIG. 1 and the fitting of FIG. 5 coupled to each other and to a hose of a fuel line.

Alternatively, as illustrated in FIG. 5, a hollow, "T" shaped fitting 16 is provided, tee fitting 16 having first, second, and third arms, 28, 30, and 32, respectively. As illustrated in FIG. 6, threaded member 19 of feed-through device 12 may be screwed into the second arm 30 of fitting 16, and the first arm 28 of fitting 16 may be coupled to a hose 20 of the fuel line, such that heat tape 18 is positioned within the hose. (A hose end fitting 29 is crimped onto bottom ends of hose 20.) The third arm 32 of fitting 16 is adapted to couple to fuel filter 44, as illustrated in FIG. 8, and discussed in greater detail below. As illustrated in FIGS. 4 and 6, a cap 31 may also be provided to cover terminal 34.

Figure 7:
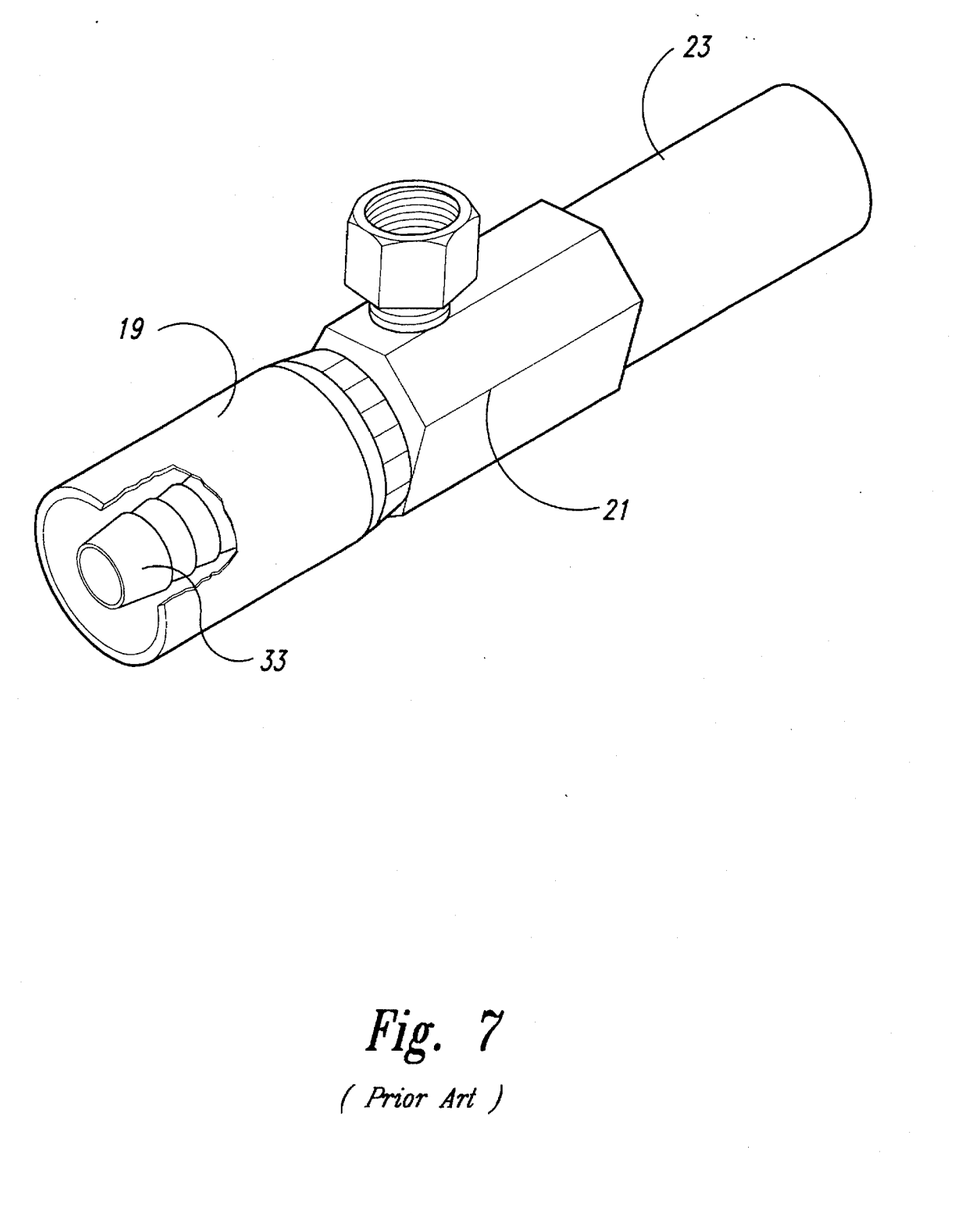
FIG. 7 is a front isometric of a prior art device illustrating an integral feed-through device, fitting and fuel tube.

A fuel line heater provided in accordance with a preferred embodiment of the present invention is therefore modular, and may be coupled to different fittings depending on the desired positioning of the heat tape in the fuel system. In contrast, the prior art configuration illustrated in FIG. 7 is comprised of an integral feed-through body 35 and fitting 37 that are crimped to fuel hose 39 provided with hose barb 33, making it impossible to change the location of a heating element provided as part of the assembly of FIG. 7.

Furthermore, in accordance with a preferred embodiment of the present invention, a heating element or length of heat tape may be provided in a fuel draw tube, thereby enhancing the free flow of fuel. Depending on operating conditions, a fuel line heating apparatus may be provided in a fuel draw tube alone, or in a hose of the fuel line, or in both.

As illustrated in FIG. 8, a temperature limit switch or sensor 40 is coupled to the fuel line 37 such that sensor 40 measures a temperature of the fuel as it flows through the fuel line, the system being activated by an operator of the vehicle via switch 50 located in the vehicle cab. If the temperature of the fuel drops below a minimum temperature, the sensor activates power supply 48 which in turn activates the heat tape. If the temperature of the fuel exceeds a maximum temperature, the sensor 40 deactivates heat tape 18, thereby preventing the further heating of fuel by heat tape 18. In a preferred embodiment, heat tape 18 is activated when a minimum temperature of 55° F. is reached, and deactivated when a maximum temperature of 80° F. is reached. (In a preferred embodiment, a model TE-740 sensor by Index Sensors & Controls, Inc., is used.)

As further illustrated in FIG. 8, fuel line 37 extends between the fuel tank 42 and fuel filter 44, and between the filter 44 and engine 46. (The fuel tank, filter and engine are illustrated schematically.) In a preferred embodiment, sensor 40 is positioned between fuel filter 44 and engine 46, given that it is likely for cooled, congealed fuel to be stored in the filter which will mix with and lower the temperature of the heated fuel being supplied to the filter. The sensor 40 therefore has a more accurate reading of the temperature of fuel being supplied to the engine.

Figure 9:
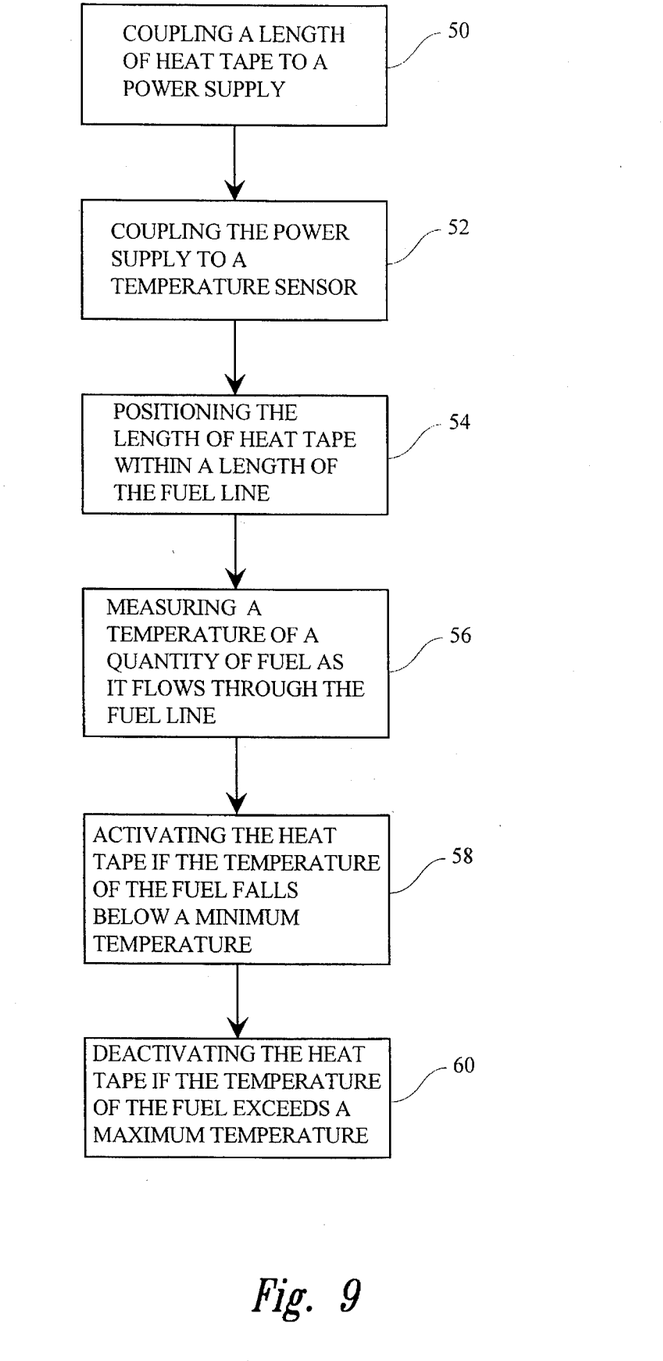
FIG. 9 is a schematic diagram illustrating the steps of a preferred embodiment of the present invention.

Therefore, in a preferred embodiment of the present invention, as illustrated in FIG. 9, a fuel line is heated by coupling a length of heat tape to a power supply, step 50; coupling the power supply to a temperature sensor, step 52; and positioning the length of heat tape within a length of the fuel line, step 54. A temperature of the fuel as it flows through the fuel line is measured, step 56, thereby activating the heat tape if the temperature of the fuel drops below a minimum desired temperature, step 58, and deactivating the heat tape if the temperature of the fuel exceeds a maximum desired temperature, step 60.

A fuel line heating apparatus and method have been shown and described. From the foregoing, it will be appreciated that, although embodiments of the invention have been described herein for purposes of illustration, various modifications may be made without deviating from the spirit of the invention. Thus, the present invention is not limited to the embodiments described herein, but rather is defined by the claims which follow.

We claim:

1. A fuel line heating apparatus comprising:
   a feed-through device being adapted to detachably attach to a fitting, the fitting being coupled to a fuel line; and
   a length of heat tape, the heat tape being integrally fixed to the feed-through device, such that when the feed-through device is attached to the fitting, the length of heat tape is positioned within the fuel line, and when the feed-through device is detached from the fitting, the length of heat tape is removed from the fuel line and remains coupled to the feed-through device.

2. The fuel line heating apparatus according to claim 1 wherein the fitting is a hollow "T" shaped member having first, second and third arms, the first arm being coupled to a fuel draw tube, the second arm being adapted to detachably attach to the feed-through device such that the length of heat tape passes through the first arm and the second arm into the fuel draw tube when the fitting is coupled to the feed-through device, and the third arm is adapted to couple to a hose of the fuel line.

3. The fuel line heating apparatus according to claim 2 wherein the second arm is provided with a threaded connector and the feed through device is provided with a threaded member, the threaded connector and the threaded member being adapted to sealingly engage each other.

4. The fuel line heating apparatus according to claim 1 wherein the fitting is a hollow "T" shaped member having first, second and third arms, the first arm being coupled to a hose of the fuel line, the second arm being adapted to detachably attach to the feed-through device such that the length of heat tape is inserted into the second arm and passed through the first arm into the hose when the fitting is coupled to the feed-through device, and the third arm is adapted to couple to a fuel filter.

5. The fuel line heating apparatus according to claim 4 wherein the second arm is provided with a threaded connector and the feed through device is provided with a threaded member, the threaded connector and the threaded member being adapted to sealingly engage each other.

6. The fuel line heating assembly according to claim 1 wherein the feed-through device is provided with a terminal and the length of heat tape further comprises a pair of conductive wires, the conductive wires being coupled to the terminal.

7. The fuel line heating apparatus according to claim 1, further comprising:

a sensor positioned along the fuel line such that the sensor senses a temperature of a quantity of fuel as the fuel flows through the fuel line, the sensor activating the heat tape when the temperature of the fuel falls below a minimum temperature, and the sensor deactivating the heat tape when the temperature of the fuel exceeds a maximum temperature.

8. The fuel line heating apparatus according to claim 7 wherein the fuel line extends between a fuel tank and a filter, and between the filter and an engine, and the sensor is positioned between the filter and the engine.

9. The fuel line heating apparatus according to claim 7 wherein the minimum temperature is 55° F. and the maximum temperature is 80° F.

10. A fuel line heating apparatus comprising:

a length of heat tape integrally fixed to a feed-through device, the feed-through device being coupled to a fitting, the fitting being Sealingly attached to a draw tube positioned in a fuel tank, the length of heat tape being inserted into the fitting and passing through the fitting into the draw tube when the feed-through device is coupled to the fitting and the fitting is coupled to the draw tube, the length of heat tape further being coupled to a power supply such that when the heat tape is activated by the power supply, the heat tape substantially melts any congealed fuel in the draw tube and heats fuel as it flows from the tank through the draw tube, thereby allowing the fuel to flow freely.

11. A fuel delivery system comprising:

a fuel line extending between a fuel tank and an engine;

a fitting coupled to the fuel line;

a feed-through device, the feed-through device being adapted to detachably attach to the fitting;

a length of heat tape, the heat tape being provided with a pair of conductive wires and being integrally fixed to the feed-through device, such that when the feed-through device is attached to the fitting, the length of heat tape is positioned within the segment of the fuel line and when the feed-through device is detached from the fitting, the length of heat tape is removed from the fuel line and remains coupled to the feed-through device; and a sensor coupled to the fuel line such that the sensor senses a temperature of a quantity of fuel as the fuel flows through the fuel line, the sensor activating the heat tape when the temperature of the fuel falls below a minimum temperature, and the sensor deactivating the heat tape when the temperature of the fuel exceeds a maximum temperature.

12. A method for heating a fuel line comprising:

integrally securing a length of heat tape to a feed-through device;

coupling the length of heat tape to a power supply;

coupling the power supply to a temperature sensor;

coupling the feed-through device to a length of the fuel line thereby inserting the heat tape into the fuel line;

measuring a temperature of a quantity of fuel as it flows through the fuel line;

activating the heat tape if the temperature of the fuel falls below a minimum temperature; and deactivating the heat tape if the temperature of the fuel exceeds a maximum temperature.

* * * * *